United States Patent
Sumita et al.

(10) Patent No.: US 6,858,311 B2
(45) Date of Patent: Feb. 22, 2005

(54) SURFACE PROTECTIVE FILM AND PROCESS FOR PRODUCING THE SAME

(75) Inventors: Katsuhiko Sumita, Himeji (JP); Masaya Omura, Himeji (JP)

(73) Assignee: Daicel Chemical Industries, Ltd., Sakai (JP)

( * ) Notice: Subject to any disclaimer, the term of this patent is extended or adjusted under 35 U.S.C. 154(b) by 0 days.

(21) Appl. No.: 10/434,472

(22) Filed: May 9, 2003

(65) Prior Publication Data

US 2004/0067371 A1 Apr. 8, 2004

(30) Foreign Application Priority Data

Oct. 3, 2002 (JP) ........................................ 2002-291062

(51) Int. Cl.$^7$ ........................... B32B 7/06; B32B 23/00; B32B 23/08; B32B 25/20; B32B 33/00
(52) U.S. Cl. ....................... 428/447; 428/452; 428/480; 428/481; 428/41.8; 428/532; 428/213; 428/215; 428/336; 428/337; 427/384; 427/339
(58) Field of Search ................................. 428/447, 452, 428/480, 481, 41.8, 532, 213, 215, 332, 334, 335, 336, 337, 446, 355 R; 427/339, 384

(56) References Cited

U.S. PATENT DOCUMENTS

| 4,889,576 A | * | 12/1989 | Suganuma et al. | .......... 156/249 |
| 5,023,288 A | * | 6/1991 | Hirai et al. | .................. 524/268 |
| 2003/0232165 A1 | * | 12/2003 | Sumita et al. | ............. 428/40.1 |

\* cited by examiner

*Primary Examiner*—Vivian Chen
(74) *Attorney, Agent, or Firm*—Armstrong, Kratz, Quintos, Hanson & Brooks, LLP (57) ABSTRACT

A surface protective film which can be easily peeled off from an adhesive silicone rubber composition layer, is free of a plasticizer or the like which may have an adverse effect on adhesion of the adhesive silicone rubber composition layer to a semiconductor chip or semiconductor chip attaching portion, and has no adverse effect on thickness uniformity or surface flatness of the adhesive silicone rubber composition layer, and a process for producing the same. More specifically, a surface protective film for protecting an adhesive silicone rubber composition layer (C), comprising a base film (A) coated, at least on one side, with a cellulose-based resin layer (B) having an SP value of 21.0 to 29.0 $(MPa)^{1/2}$, determined by the Fedors method, and process for producing the same.

6 Claims, 2 Drawing Sheets

SURFACE PROTECTIVE FILM AND PROCESS FOR PRODUCING THE SAME

BACKGROUND OF THE INVENTION

1. Field of the Invention

The present invention relates to a surface protective film and process for producing the same, more particularly a surface protective film which can be easily peeled off from an adhesive silicone rubber composition layer, free of a plasticizer or the like, which may have an adverse effect on adhesion of the adhesive silicone rubber composition layer to a semiconductor chip or portion at which a semiconductor chip, and having no adverse effect on thickness uniformity or surface flatness of the adhesive silicone rubber composition layer, and process for producing the same.

2. Description of the Related Art

A semiconductor device, also referred to as semiconductor equipment, is composed of semiconductor chips encased in a package, and has been used for control and arithmetic circuits for electronic computers, TV sets, DVD's, VTR's, radios, microwave ovens, automobiles, airplanes, chemical plants, and so on.

Figure 1:
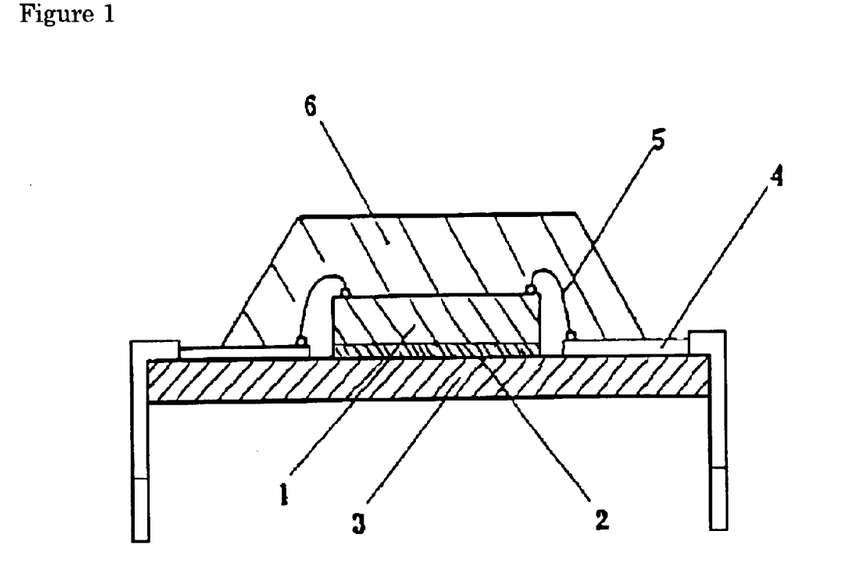
FIG. 1 is a cross-sectional view of one example of the semiconductor device (hybrid IC) which includes the laminate of the present invention.
Figure 2:
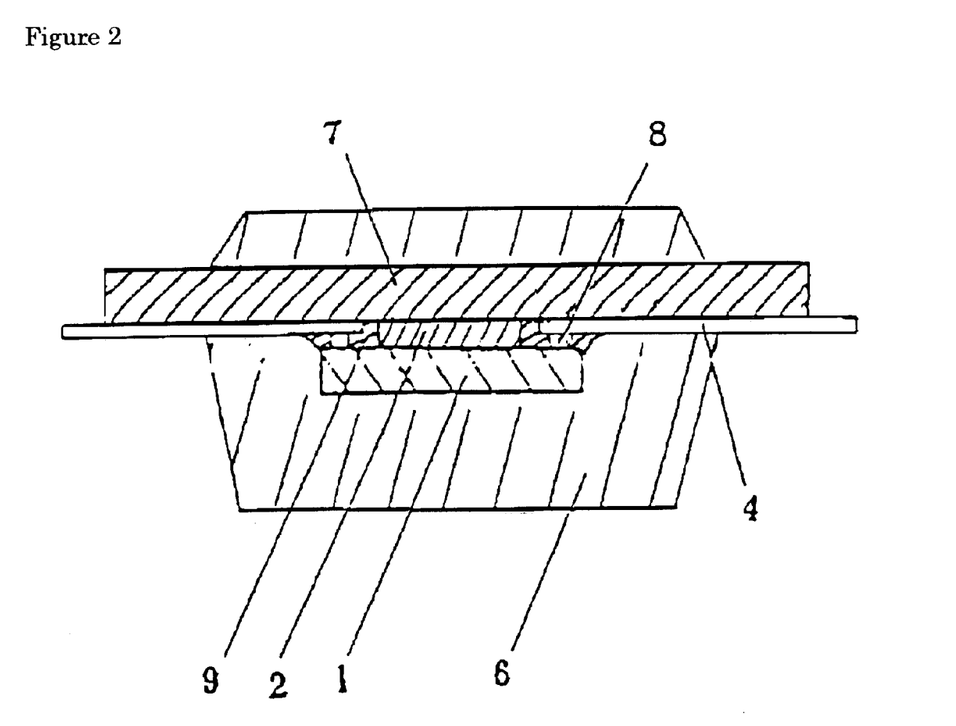
FIG. 2 is a cross-sectional view of another example of the semiconductor device (LSI) which includes the laminate of the present invention.
Figure 3:
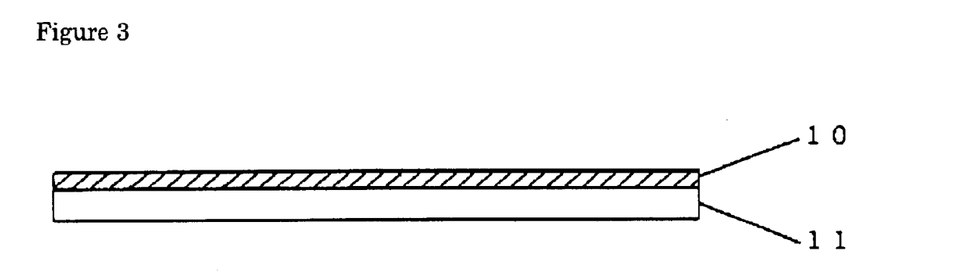
FIG. 3 is a cross-sectional view of one example of the surface protective film of the present invention.
Figure 4:
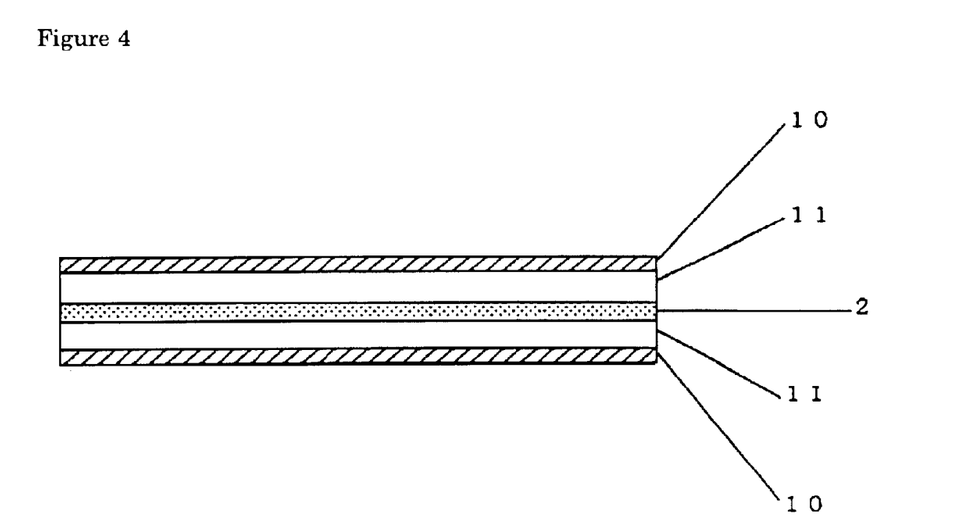
FIG. 4 is a cross-sectional view of one example of the film of A/B/C/B/A structure as one of the purposes of the surface protective film of the present invention.

There are many types of semiconductor devices, and some of the representative ones are illustrated in FIGS. 1 and 2. A semiconductor device is described by referring to FIG. 1. The semiconductor chip 1 (sometimes referred to as silicon wafer), which may be an IC or LIC, is at the center of the device, with its lower side being bonded to the upper side of the adhesive silicone rubber composition layer 2, whose lower side is bonded to the upper side of the semiconductor chip attaching portion 3. This assembly condition is sometimes expressed in this specification that the semiconductor chip 1 is bonded (synonymous with "attached," which may be interchangeably used) to the semiconductor chip attaching portion 3 via the adhesive silicone rubber composition layer 2.

The adhesive silicone rubber composition layer works to bond the semiconductor chip 1 to the semiconductor chip attaching portion 3, and, at the same time, to relax stress between these components.

The semiconductor chip 1 is connected to the circuit wiring 4 by the bonding wire 5, and the block composed of the semiconductor chip 1, adhesive silicone rubber composition layer 2, semiconductor chip attaching portion 3 and circuit wiring 4 is sealed with a sealant of epoxy-based resin, which protects these components from dust and moisture in the air, impact and so on, and, at the same time, releases heat produced inside into the outside.

A semiconductor chip has been bonded to a semiconductor chip attaching portion by a silicone-based adhesive agent, e.g., of liquid, crosslinkable (synonymous with "curable," which may be interchangeably used) silicone composition or pasty, crosslinkable silicone composition.

Some of the representative silicone-based adhesive agents are of crosslinkable silicone composition of, e.g., organopolysiloxane having per molecule at least two Si-bonded alkenyl groups or organopolysiloxane having per molecule at least two Si-bonded hydrogen atoms; crosslinkable silicone composition comprising a hydrosilylation catalyst; or crosslinkable silicone composition incorporated with an organopolysiloxane having per molecule at least one Si-bonded alkoxy or alkenyl group, or hydrogen atom, as disclosed by, e.g., Japanese Patent Laid-open Application No.3-157474, where the organopolysiloxane works as an adhesion promoter.

The crosslinkable silicone composition involves a problem that low-viscosity silicone oil oozes out from the composition while being crosslinked to contaminate the composition surroundings. Moreover, the low-viscosity silicone oil is very difficult to completely remove, because it may be an organopolysiloxane of low degree of polymerization contained in an organopolysiloxane as the main ingredient or as an adhesion promoter. This may cause a problem of deteriorated reliability of the semiconductor device, because the assembly comprising a semiconductor chip and semiconductor chip attaching portion bonded to each other by such a curable silicone composition may have deteriorated wire bondability between a bonding pad on the chip and bonding wire or beam lead.

The techniques which have solved these problems include an adhesive silicone rubber composition layer (synonymous with "sheet," which may be interchangeably used) which can well bond a semiconductor chip and semiconductor chip attaching portion to each other, and hence give a highly reliable semiconductor device, while oozing out of low-viscosity silicone oil is controlled during the crosslinking step; process for efficiently producing the adhesive silicone rubber composition layer for a highly reliable semiconductor device with the adhesive silicone rubber composition layer of particularly high adhesion; and highly reliable semiconductor device with semiconductor chip and semiconductor chip attaching portion bonded to each other by the adhesive silicone rubber composition layer, as disclosed by Japanese Patent Laid-open Application No.11-12546.

The adhesive silicone rubber composition layer may be contaminated with dust or moisture in the air, when its surface is kept exposed, which can deteriorate performance of the semiconductor chip and/or semiconductor chip attaching portion when these components are bonded to the layer. Therefore, the layer should be protected by a protective film against dust and moisture.

The protective films include those of fluorine, polyethylene, polypropylene and polyimide resin, as disclosed by Japanese Patent Laid-open Application No.11-12546. Moreover, Japanese Patent Laid-open Application No.2001-19933 discloses polyester, polyether (conceivably special rubber of polyether), polyether sulfone, epoxy and phenol resin, among others, for the surface protective film.

A fluorine-based film, although good in releasability, involves a problem of reduced adhesive strength of the adhesive silicone rubber composition layer to the semiconductor chip, semiconductor chip attaching portion or the like, after it is peeled off.

A polyethylene or polypropylene resin sheet (synonymous with "film" "layer" or the like, which may be interchangeably used), although low in cost, has a melting point lower than crosslinking temperature of the adhesive silicone rubber composition to cause a problem of deformed surface protective film itself with the result that the adhesive silicone rubber composition layer of constant thickness may be no longer formed.

A polyimide resin sheet, although very high in heat resistance and dimensional stability, involves problems of high cost and slightly low releasability from the adhesive silicone rubber composition layer.

A polyester resin sheet, represented by polyethylene terephthalate (PET) sheet, although favorable in that it is free of fisheye or uneven thickness, involves a problem of poor releasability.

A polyether resin sheet involves problems of insufficient surface flatness, high cost and very poor releasability from the adhesive silicone rubber composition layer.

A polyether sulfone (sometimes referred to as PES) resin sheet has been used as a surface protective film most widely, because of its good releasability from the adhesive silicone rubber composition layer, but involves a problem of causing insufficient punching characteristics of the silicone laminate to increase defective product yield.

An epoxy resin sheet is not used, because of very poor releasability from the adhesive silicone rubber composition layer.

A phenol resin sheet is not used, because of very poor flexibility.

The common releasing film (separator) is difficult to use as the surface protective film, because it is surface-treated with silicone for releasability to deteriorate its releasability from the adhesive silicone rubber composition layer, which is similar to the film surface.

The conventional procedure for bonding the semiconductor chip and semiconductor chip attaching portion to each other with the adhesive silicone rubber composition layer in-between exposes the semiconductor chip to high temperature, because it requires heating the adhesive silicone rubber composition layer at relatively high temperature for extended periods to improve its adhesive strength. This can deteriorate performance of the semiconductor chip. Therefore, the adhesive silicone rubber composition layer tends to be incorporated with a silicone-based adhesion promoter. However, as discussed earlier, use of the silicone-based adhesion promoter may cause problems of deteriorated releasability of the surface protective film from the adhesive silicone rubber composition layer to obstruct the releasing works, and uneven thickness of the adhesive silicone rubber composition layer left by the surface protective film. These problems may cause difficulty in producing semiconductor devices of high quality.

SUMMARY OF THE INVENTION

In consideration of the problems involved in the conventional techniques, it is an object of the present invention to provide a surface protective film which can be easily peeled off from an adhesive silicone rubber composition layer, is free of a plasticizer or the like which may have an adverse effect on adhesion of the adhesive silicone rubber composition layer to a semiconductor chip or semiconductor chip attaching portion, and has no adverse effect on thickness uniformity or surface flatness of the adhesive silicone rubber composition layer. It is another object of the present invention to provide a process for producing the same.

The inventors of the present invention have found, after having made on a trial basis variety types of plastic films and plastic film laminates, and having extensively conducted a number of tests to investigate releasability of the plastic films from an adhesive silicone rubber composition layer, and their effects on adhesion of the adhesive silicone rubber composition layer to the semiconductor chip and semiconductor chip attaching portion, and on thickness uniformity of the adhesive silicone rubber composition layer and its surface flatness, that a surface protective film comprising a base film coated, at least on one side, with a cellulose-based resin layer having a specific SP value (Solubility Parameter; determined by the Fedors method) gives good results, achieving the present invention.

The first aspect of the present invention provides a surface protective film for protecting an adhesive silicone rubber composition layer (C), comprising a base film (A) coated, at least on one side, with a cellulose-based resin layer (B) having an SP value of 21.0 to 29.0$(MPa)^{1/2}$, determined by the Fedors method.

The second aspect of the present invention provides the surface protective film of the first aspect, wherein the base film (A) is a polyethylene terephthalate film, and the base film (A) and cellulose-based resin layer (B) are laminated at an adhesive strength of 200 N/m or more.

The third aspect of the present invention provides the surface protective film of the first aspect, wherein the cellulose-based resin layer (B) is of cellulose acetate having an acetylation degree of 47 to 63.

The fourth aspect of the present invention provides the surface protective film of the first aspect, wherein the cellulose-based resin layer (B) contains a residual organic solvent at 10 $\mu g/m^2$ or less.

The fifth aspect of the present invention provides the surface protective film of the first aspect, wherein the base film (A) is 10 to 200 $\mu m$ thick and cellulose-based resin layer (B) is 0.3 to 10 $\mu m$ thick.

The sixth aspect of the present invention provides a process for producing the surface protective film of one of the first to fifth aspects, wherein a dope containing a cellulose-based resin is spread and dried at least on one side of the base film (A) to form the cellulose-based resin layer (B) thereon.

NOTATION

1 Semiconductor chip
2 Adhesive silicone rubber composition layer (sheet)
3 Semiconductor chip attaching portion (circuit base of glass-fiber-reinforced epoxy resin)
4 Circuit base
5 Bonding wire
6 Sealant resin
7 Semiconductor chip attaching portion (circuit base of polyimide resin)
8 Bump
9 Sealant/filler
10 Base film layer (polyethylene terephthalate (PET) layer)
11 Cellulose-based resin layer (coating film of cellulose acetate)
12 Adhesive silicone rubber composition layer (sheet)

DETAILED DESCRIPTION OF THE INVENTION

The surface protective film of the present invention is described for each item.
1. Base Film (A)

The base film (A) for the present invention is the film serving as the base for the surface protective film of the present invention. It is responsible for mechanical strength of the surface protective film, and is coated, at least on one side, with a cellulose-based resin layer (B) having an SP value (Solubility Parameter) of 21.0 to 29.0$(MPa)^{1/2}$, determined by the Fedors method.

The materials useful for the base film (A) include polyethyleneterephthalate, polybutyleneterephthalate, polyethylenenaphthalate, polybutylenenaphthalate, polycarbonate, highdensity polyethylene, linear lowdensity polyethylene, polypropylene, poly-4-methylpentene-1, polystyrene, polysulfone, polyether sulfone (PES), polyphenylene sulfide, poly-p-phenyleneterephthalamide, polyamide, polyetheretherketone, polyarylate, polyphenylene ether, polyacetal, polymethylmethacrylate, polyacrylonitrile, polychlorotrifluoroethylene, polytetrafluoroethylene, polyparaxylene, polyetherimide, polyimide, vinyl polychloride, polyurethane and epoxy resin for films (sheets).

Of these resin films, the most preferable one is a polyethylene terephthalate film for various reasons, e.g., moderate cost, being free of problems associated with fisheye and uneven thickness, high toughness to secure good handleability, high adhesion to the cellulose-based resin layer (B), and high adhesion strength of 200 N/m or more at which it can be laminated on the resin layer (B).

When the adhesive strength is below 200 N/m and lower than peel strength for separating the surface protective film from the adhesive silicone rubber composition layer (C), the object of the present invention cannot be achieved, because the base film (A) is separated from the cellulose-based resin layer (B) before the surface protective film is peeled off from the adhesive silicone rubber composition layer (C).

These resins may be used either individually or in combination.

Film thickness is not limited. For example, it is 10 to 200 $\mu$m, preferably 30 to 150 $\mu$m, more preferably 40 to 100 $\mu$m. At below 10 $\mu$m, it may be insufficient in toughness to deteriorate its handleability. On the other hand, thickness of above 200 $\mu$m is undesirable, because it may be excessively tough and difficult to be rolled, and the material cost will run up to push up the cost, because of quality runaway.

The base film (A) may be incorporated, as required, with an additive, e.g., anti-oxidant, thermal stabilizer, lubricant, pigment or UV protective agent.

Moreover, it may be treated by, e.g., corona discharge or undercoating, to improve adhesion of the interface with the cellulose-based resin layer (B).

2. Cellulose-Based Resin Layer (B)

The cellulose-based resin layer (B) for the present invention serves as the interface with the adhesive silicone rubber composition layer (C). As such, it is necessary for the layer (B) to be easily peeled off from the layer (C), and free of any component which may have an adverse effect on its adhesion to semiconductor chip or semiconductor chip attaching portion on the adhesive silicone rubber composition layer (C).

For the interface to have good releasability, the cellulose-based resin layer (B) should have an SP value of 21.0 to 29.0(MPa)$^{1/2}$, determined by the Fedors method (refer to Polymer Engineering and Science, 14, 147 (1974)). The interface may not be smoothly peeled off from the adhesive silicone rubber composition layer (C) when it is below 21.0(MPa)$^{1/2}$, and the cellulose-based resin layer (B) may be difficult to produce when it is above 29.0(MPa)$^{1/2}$.

The cellulose-based resins having an SP value in the above range include carboxymethyl cellulose, carboxyethyl cellulose, hydroxymethyl cellulose, hydroxyethylmethyl cellulose, hydroxypropylmethyl cellulose, hydroxyethyl cellulose, nitrocellulose, cellulose tricarbanilate, cellulose tributyrate, cellulose tribenzoate, cellulose trivalerate, cellulose xanthogenate, cellulose sulfate, cellulose acetate, cellulose acetopropionate, cellulose acetobutyrate, cellulose trifluoroacetate, tosyl cellulose, cellulose phosphate and cyanoethyl cellulose.

Of the above cellulose-based resins, cellulose acetate having an acetylation degree of 47 to 63% is particularly preferable. Cellulose acetate is a semi-synthetic polymer with 3 hydroxyl groups esterified by acetyl groups on the glucose ring which constitutes the cellulose molecular skeleton, to substitute the hydrogen atom in the hydroxyl group by acetyl group. Degree of substitution means number of hydrogen atoms in the 3 hydroxyl groups substituted by acetyl group. For example, substitution degree of 3 means all of 3 hydroxyl groups being substituted, and substitution degree of 2 means 2 hydroxyl groups being substituted to leave one hydroxyl group unsubstituted.

Acetylation degree (%) is percentage by weight of the introduced acetyl group substituted by acetic acid.

Acetylation degree and substitution degree satisfy the following relationship:

Substitution degree=Acetylation degree×3.86/142.9−Acetylation degree

According to the above relationship, acetylation degrees of 47, 55, 61 and 63% correspond to substitution degrees of 1.9, 2.4, 2.9 and 3.0, respectively.

Cellulose acetate has properties greatly changing with substitution degree. In the present invention, cellulose acetate having a substitution degree of 47 to 63% is used.

Cellulose acetate having a substitution degree below 47% may cause problems, e.g., difficulty in separating the surface protective film from the adhesive silicone rubber composition layer (C) because of increased peel strength from the layer (C), and difficulty in making the dope (high-viscosity solution of cellulose acetate in a solvent at a high nonvolatiles content of around 5 to 15%) because of decreased solubility in the solvent. On the other hand, cellulose acetate having a substitution degree above 63% may be difficult to produce.

It is necessary for the cellulose-based resin layer (B) for the present invention is laminated on the base film (A) at an adhesive strength of 200 N/m or more, and cannot be peeled off from the film (A) at a lower strength.

It can be easily peeled off from an adhesive silicone rubber composition layer (C) without adversely affecting adhesion performance of the layer (C), because it is laminated on the layer (C) at a peel strength of 5 N/m or less, to achieve the object of the present invention.

The cellulose-based resin layer (B) can be easily laminated as a thin film of dope having a thickness of 0.3 to 15 $\mu$m, preferably 1 to 3 $\mu$m, on a polyethylene terephthalate film by solvent casting, which can provide the high-quality surface protective film at a lower cost than dry lamination.

The starting material for forming a single-layered film of cellulose-based resin by dry lamination is fragile in itself, and hence is necessarily formed into a thick film having a thickness of 100 $\mu$m or more after being incorporated with a plasticizer to reduce its fragility. The plasticizer may have adverse effects on adhesion characteristics of the adhesive silicone rubber composition layer (C) and on performance of the semiconductor chip. Moreover, a thin film having a thickness of 1 to 15 $\mu$m cannot be formed by dry lamination. Therefore, a surface protective film comprising a polyethylene terephthalate film, adhesive agent and single-layered cellulose-based resin film formed by the conventional dry lamination process cannot be used for the present invention, because it needs a high production cost and involves problems of adverse effects of the incorporated plasticizer on adhesion and semiconductor functions of the object to which it is bonded.

3. Surface Protective Film

The surface protective film of the present invention contains a cellulose-based resin layer (B) having an SP value of 21.0 to 29.0(MPa)$^{1/2}$ (determined by the Fedors method), formed at least on one side of the base film (A). The cellulose-based resin, layer (B) is preferably a cellulose acetate layer having an acetylation degree of 47 to 63.

The base film (A) is preferably a polyethylene terephthalate film and laminated on the cellulose-based resin layer (B) at an adhesive strength of 200 N/m or more.

The surface protective film of the present invention preferably comprises the 10 to 200 μm thick base film (A) coated, at least on one side, with the 0.3 to 10 μm thick, preferably 1 to 3 μm thick, cellulose-based resin layer (B) formed by spreading and drying a dope (high-viscosity solution of resin).

The organic solvent used for forming the cellulose-based resin layer (B) for the surface protective film preferably remains at 10 μg/m$^2$ or less. Content of the residual organic solvent of above 10 μg/m$^2$ is undesirable, because it may have adverse effects on adhesion characteristics of the adhesive silicone rubber composition layer (C) and on performance of the semiconductor chip.

The surface protective film of the present invention is to protect, from dust, the adhesive silicone rubber composition layer (C), which works to bond the semiconductor chip to the semiconductor chip attaching portion, and hence is peeled off from the layer (C) before it is used.

When the surface protective film of the present invention covers both sides of the adhesive silicone rubber composition layer (C) having a thickness of 100 μm or less, each of the films is preferably bonded to the layer (C) at a peel strength of 5 N/m or less.

When it is bonded to the layer (C) at a peel strength above 5 N/m, the adhesive silicone rubber composition layer (C) may be damaged when the surface protective film is peeled off therefrom. The surface protective films are preferably bonded to both sides of the layer (C) at a different peel strength by 0.2 N/m or more. When the difference is below 0.2 N/m, the adhesive silicone rubber composition layer (C) may not be closely bonded to the one surface protective film while the other protective film is peeled off. The laminate may be a defective product, when both surface protective films are peeled off simultaneously.

4. Adhesive Silicone Rubber Composition Layer (C)

In the present invention, the adhesive silicone rubber composition layer (C) works to support the semiconductor chip and semiconductor chip attaching portion, which are bonded to the layer (C). It works as an intermediate layer between two surface protective films, each being laminated on the layer (C) via the cellulose-based resin layer (B).

The adhesive silicone rubber composition layer (C) is already crosslinked (cured) or semi-crosslinked (semi-cured) before the surface protective film is bonded thereto. The starting material for the layer (C) is a silicone rubber composition, which is not crosslinked (cured) or semi-crosslinked (semi-cured).

The silicone rubber composition is sometimes referred to as the crosslinkable silicone rubber composition to indicate that it is crosslinkable, although not crosslinked yet.

In the present invention, therefore, the starting material is referred to as the crosslinkable silicone rubber composition to distinguish itself from the adhesive silicone rubber composition layer (C).

4.1 Crosslinkable Silicone Rubber Composition

In the present invention, the crosslinkable silicone rubber composition may be crosslinked by various methods, e.g., hydrosilylation or condensation, or by the aid of organic peroxide or ultraviolet ray. It is preferably crosslinked by hydrosilylation. One of the examples of the silicone compositions crosslinkable by hydrosilylation comprises (a) organopolysiloxane having per molecule at least 2 Si-bonded alkenyl groups, (b) organopolysiloxane having per molecule at least 2 Si-bonded hydrogen atoms, (c) adhesion promoter and (d) hydrosilylation catalyst.

The component (a), which is the main ingredient of the composition, is an organopolysiloxane having per molecule at least 2 Si-bonded alkenyl groups. Its molecular structure may be of straight-chain, partly branched straight-chain, branched chain or network. The Si-bonded alkenyl group in the component (a) may be vinyl, allyl, butenyl, pentenyl or hexenyl group, of which vinyl group is particularly preferable. It may be bonded at the terminal and/or side chain in the molecular chain.

The Si-bonded group other than alkenyl in the component (a) may be alkyl group, e.g., methyl, ethyl, propyl, butyl, pentyl, hexyl or heptyl; aryl group, e.g., phenyl, tolyl, xylyl or naphthyl; aralkyl group, e.g., benzyl or phenethyl; or monovalent hydrocarbon group, e.g., halogenated alkyl group (e.g., chloromethyl, 3-chloropropyl or 3,3,3-trifluoropropyl), which may be substituted or not substituted, of which methyl and phenyl groups are particularly preferable.

Content of phenyl group is preferably 1% by mol or more of the total Si-bonded organic groups in the component (a), more preferably 1 to 60%, still more preferably 1 to 30%, because the silicone-based adhesive sheet containing phenyl group at a content in the above range will exhibit excellent low-temperature resistance and the semiconductor device comprising the sheet will have improved reliability. Viscosity of the component (a) is not limited, but preferably 100 to 1,000,000 mPa·s at 25° C.

The component (b), which works as a crosslinking agent for the composition, is an organopolysiloxane having per molecule at least 2 Si-bonded hydrogen atoms. Its molecular structure may be of straight-chain, partly branched straight-chain, branched chain, ring or network. It may be bonded at the terminal and/or side chain in the molecular chain.

The Si-bonded group other than hydrogen atom in the component (b) may be alkyl group, e.g., methyl, ethyl, propyl, butyl, pentyl, hexyl or heptyl; aryl group, e.g., phenyl, tolyl, xylyl or naphthyl; aralkyl group, e.g., benzyl or phenethyl; or monovalent hydrocarbon group, e.g., halogenated alkyl group (e.g., chloromethyl, 3-chloropropyl or 3,3,3-trifluoropropyl), which may be substituted or not substituted, of which methyl and phenyl groups are particularly preferable. Viscosity of the component (b) is not limited, but preferably 1 to 100,000 mPa·s at 25° C.

The component (b) should be incorporated at a sufficient content to crosslink (cure) the composition, preferably to have the Si-bonded hydrogen atom at 0.5 to 10 mols per mol of the Si-bonded alkenyl group in the composition, particularly preferably 1 to 5 mols. At below 0.5 mols per mol of the Si-bonded alkenyl group in the composition, the composition tends to be not cured sufficiently. At above 10 mols, on the other hand, the crosslinked composition tends to have decreased resistance to heat.

The component (c) works to improve adhesion of the crosslinked composition. Some examples of the component (c) include silatrane derivatives and silicone compounds containing a functional group, described below.

For silatrane derivatives, see Japanese Patent Laid-open Application Nos.2001-19933, 2000-265063, 2000-302977, 2001-261963, 2002-38014 and 2002-97273, which describe these compounds in detail. Some of the compounds described by these publications are:

(1)

(2)

(3)

(4)

(5)

The silicone compounds containing a functional group include vinyl triethoxysilane, vinyl tris(2-methoxyethoxy) silane, 3-glycidoxypropyltrimethoxysilane, 2-(3,4-epoxycyclohexyl)ethyltrimethoxysilane, vinyl trimethoxysilane, 3-methacryloxypropyltrimethoxysilane, 3-acryloxypropyltrimethoxysilane, 3-aminopropyltrimethoxysilane, 3-aminopropyltriethoxysilane, N-(2-aminoethyl)-3-aminopropyltrimethoxysilane, N-(2-aminoethyl)-3-aminopropylmethyldimethoxysilane, N-phenyl-3-aminopropyltrimethoxysilane, 3-mercaptopropyltrimethoxysilane and 3-chloropropyltrimethoxysilane.

Examples of organosiloxane oligomers include the following compounds.

(6)

(7)

The component (c) should be incorporated at a sufficient content to secure good adhesion to the adhesive silicone rubber composition layer (C), e.g., preferably at 0.01 to 20 parts by weight per 100 parts by weight of the component (a), particularly preferably 0.1 to 10 parts. At below 0.01 parts, the adhesive silicone rubber composition layer (C) tends to have deteriorated adhesion. At above 20 parts, on the other hand, the layer (C) tends to have deteriorated stability while not increasing much in adhesion.

The component (d) works as a catalyst to promote crosslinking of the crosslinkable silicone rubber composition by hydrosilylation. Examples of the catalysts include known hydrosilylation catalysts, e.g., platinum-, rhodium- and palladium-based ones. In particular, the preferable ones are platinum-based catalysts, e.g., finely powdered platinum, platinum black, finely powdered silica carrying platinum, activated coal carrying platinum, chloroplatinic acid, alcohol solution of chloroplatinic acid, and olefin, alkenylsiloxane and carbonyl complexes of platinum, because of their capacity for speeding up the reaction.

The component (d) should be incorporated at a sufficient content to promote crosslinking the composition, e.g., preferably at 0.01 to 1,000 ppm by weight as the metallic platinum on the composition, particularly preferably 0.1 to 500 ppm, when a platinum-based catalyst is used. At below 0.01 ppm, crosslinking rate tends to greatly decrease. At above 1,000 ppm, on the other hand, problems may take place, e.g., coloration of the crosslinked composition while crosslinking rate is not improved much.

The composition is preferably incorporated with a hydrosilylation inhibitor to control hydrosilylation rate. The hydrosilylation inhibitors useful for the present invention include alkyne alcohol, e.g., 3-methyl-1-butyne-3-ol, 3,5-dimethyl-1-hexyne-3-ol and phenyl butynol; -ene/-yne compounds, e.g., 3-methyl-3-penten-1-yne and 3,5-dimethyl-3-hexen-1-yne; 1,3,5,7-tetramethyl-1,3,5,7-tetravinylcyclotetrasiloxane, 1,3,5,7-tetramethyl-1,3,5,7-tetrahexenylcyclotetrasiloxane and benzotriazole. Content of the hydrosilylation inhibitor is preferably 0.00001 to 5 parts by weight per 100 parts by weight of the component (a) for practical purposes, although varying depending on crosslinking conditions for the composition.

The composition may be further incorporated with one or more optional components, e.g., inorganic filler (e.g., precipitated, wet, fumed or fired silica, or titanium oxide, alumina, glass, quartz, aluminosilicate, iron oxide, zinc oxide, calcium carbonate, carbon black, silicon carbide, silicon nitride or boron nitride); the above-described inorganic filler treated with an organosilicon compound (e.g., organohalosilane, organoalkoxysilane or organosilazane); finely powdered organic resin (e.g., silicone, epoxy or fluorine resin); filler of powdered electroconductive metal (e.g., silver or copper); or dye, pigment, flame retardant or solvent.

5. Process for Producing Surface Protective Film

The process of the present invention for producing the surface protective film spreads and dries a dope containing a cellulose-based resin at least on one side of the base film (A). The dope is spread to form the cellulose-based resin layer (B) by a roll coater, reverse roll coater, air knife coater, blade coater, sprayer or wire bar. It is preferably dried at first at 25 to 40° C. and 70 to 100% RH for 2 to 10 minutes, and then at 50 to 150° C. and 30 to 70% RH for 0.1 to 5 minutes.

The solvents useful for producing the dope (high-viscosity solution of resin) include acetone, methylethylketone (MEK), methylpropylketone, methylbutylketone, methylisobutylketone, methylcellosolve, ethylcellosolve, methylcellosolve acetate, ethylcellosolve acetate, dimethyl sulfoxide (DMSO), cyclopentanol, cyclohexanol, 4-methylcyclohexanol, 3,5-dimethylcyclohexanol, cyclohexanone, 1,4-dioxane, tetrahydrofuran, tetrahydropyran, diethyl ether, diisopropyl ether, dimethoxyethane, benzene, xylene, toluene, methyl chloride, ethylene chloride, formamide, acetamide, N-methylformamide, N-methylacetamide, N,N-dimethylformamide, N,N-dimethylacetamide, acetonitrile, propionitrile, benzonitrile, formic acid, acetic acid, propionic acid, maleic anhydride, acetic anhydride, methanol, ethanol, isopropanol, butanol, nitromethane, nitroethane and nitropropane. The particularly preferable solvent is a 3/2 mixture of acetone/methylethylketone.

6. Purposes of Surface Protective Film

The surface protective film of the present invention, comprising the base film (A) coated, at least on one side, with the cellulose-based resin layer (B), is used to protect the adhesive silicone rubber composition layer (C). The surface protective film is bonded to the adhesive silicone rubber composition layer (C) via the cellulose-based resin layer (B). The whole layered structure is preferably composed of the A/B/C/B/A layers, in this order.

The layered structure of A/B/C/B/A is a representative one. However, orders of these layers may be B/A/B/C/B/A, A/B/C/B/A/B, B/A/B/C/B/A/B, A/B/C/B/A/B/C/B/A, or A/B/C/B/A/B/C/B/A/B/C/B/A.

The semiconductor device, e.g., that shown in FIG. 1 or 2, is produced by peeling off the surface protective film (B/A) from the lower side of the film of A/B/C/B/A structure, bonding the exposed adhesive silicone rubber composition layer (C) to the upper side of the semiconductor chip attaching portion, peeling off the surface protective film (B/A) from the upper side of the remaining film of A/B/C structure, and bonding the exposed adhesive silicone rubber composition layer (C) to the lower side of the semiconductor chip.

EXAMPLES

The surface protective film and laminate of the present invention are described in detail by EXAMPLES, which by no means limit the present invention.

The surface protective film and laminate of the present invention were evaluated for adhesion, peel strength, adhesive strength, residual solvent and acetylation degree by the following procedures.

[Adhesion of Adhesive Silicone Rubber Composition Layer]

Two silicon wafers (each 3 by 3 cm) were laminated one on another via an adhesive silicone rubber composition layer (1 by 1 cm), and thermally treated at 100° C. for 10 minutes, while they were pressed to each other at 5 kg/cm$^2$, to prepare the sample. Two polyimide films for FPC (each 3 by 3 cm) were laminated one on another via an adhesive silicone rubber composition layer (1 by 1 cm), and thermally treated at 100° C. for 10 minutes, while they were pressed to each other at 5 kg/cm$^2$, to prepare the sample. Each sample was tensile-tested in which it was subjected to a pulling stress to find cohesive failure rate (%), i.e., ratio of the cohesive-failed area of the adhesive silicone rubber composition layer.

[Peel Strength of Adhesive Silicone Rubber Composition Layer]

The laminate was cut into a 1 cm wide, 15 cm long strip, and the surface protective film on one side was pulled to 180° at a speed of 1000 mm/minute by a tensile tester. The average stress was defined as peel strength.

[Adhesive Strength of Cellulose-Based Resin Layer]

The surface protective film on which a Cellotape® was put was cut into a 2.5 cm wide, 15 cm long strip, and the Cellotape® was pulled to 180° at a speed of 1000 mm/minute by a tensile tester. The average stress was defined as adhesive strength.

[Content of Residual Solvent in Cellulose-Based Resin Layer]

The surface protective film (5 by 5 cm) contained in a 500 mL glass sample bottle was put in an oven kept at 100° C. for 60 minutes, and gas concentration in the bottle was measured by gas chromatography.

[Acetylation Degree]

Approximately 5 g of the crushed sample was dried at 100 to 105° C. for 2 hours by a drier, and then accurately weighed.

The sample was put in an Erlenmeyer flask and completely dissolved in 50 cc of purified acetone put in the flask, to which 50 cc of a 0.2N aqueous solution of NaOH and then 50 cc of 0.2N aqueous solution of HCl were added in this order. The solution was titrated with 0.2N aqueous solution of NaOH with phenolphthalein as the indicator. Acetylation degree was determined by the following formula:

$$\text{Acetylation Degree } (\%)=(A-B) \times F \times 1.201/\text{sample weight } (g)$$

wherein,

A: Quantity of the 0.2N aqueous solution of NaOH used for titration (cc)

B: Quantity of the 0.2N aqueous solution of NaOH used for titration (cc) in the blank test F: Factor of the 0.2N aqueous solution of NaOH The materials for the surface protective films used in EXAMPLES and COMPARATIVE EXAMPLES are described.

PET Film

Teijin Du Pont Films Japan's Tetron® HS (thickness: 38 μm)

PET: polyethylene terephthalate

PES Film

Sumitomo Chemical's PES resin (Sumikaexcel® PES5200G) was dried at 160° C. for 8 hours to a moisture content of 0.08% by weight. The pelletized PES resin was melt-extruded at 300° C. by an extruder equipped with a T-die, and cooled and solidified into a 50 μm thick PES film.

PES: polyether sulfone

Cellulose Acetate Layer

Daicel chemical's LM80 (acetylation degree: 51) and L20 (acetylation degree: 55) were dissolved in a 3/2 mixed solvent of acetone/MEK to prepare the coating solution containing nonvolatiles at 8%, which was formed into a coating film (2 μm thick on a dry basis) by a reverse roll coater.

Daicel chemical's LT35 (acetylation degree: 61) was dissolved in DMSO as a solvent to prepare the coating solution containing nonvolatiles at 8%, which was formed into a coating film (2 μm thick on a dry basis) by a reverse roll coater.

The materials for the adhesive silicone rubber composition layers used in EXAMPLES and COMPARATIVE EXAMPLES are described.

[Materials for Adhesive Silicone Rubber Composition Layer]

72 parts of dimethyl polysiloxane (vinyl group content: 0.08% by weight) whose dimethyl vinyl siloxy group at both molecular chain terminals was sealed, having a viscosity of 40,000 mPa·s, 15 parts of dimethyl siloxane/methyl vinyl siloxane copolymer (vinyl group content: 0.84% by weight) whose dimethyl vinyl siloxy group at both molecular chain terminals was sealed, having a viscosity of 6,000 mPa·s, 1.5 parts of water, 3 parts of hexamethyldisilazane and 10 parts of finely powdered, dry silica having a BET-determined specific surface area of 200 m$^2$/g, all parts by weight, were mixed with each other by a Ross mixer for 1 hour, and then at 170° C. for 2 hours under a vacuum. The mixture was cooled to room temperature, to prepare a semi-transparent, pasty silicone rubber base.

Next, 100 parts of the silicone rubber base described above was uniformly mixed with 3 parts of dimethyl siloxane/methyl hydrogen siloxane copolymer (Si-bonded hydrogen atom content: 0.7% by weight) whose trimethylsiloxy group at both molecular chain terminals was sealed, having a viscosity of 5 mPa·s, 1.0 part of a silatrane derivative prepared in REFERENCE EXAMPLE 1 (described later), a platinum complex of 1,3-divinyl-1,1,3,3-tetramethyldisiloxane (metallic platinum content in the complex for the composition: 5 ppm by weight), and 0.01 parts of 3-phenyl-1-butyne-3-ol, all parts by weight, to prepare the silicone rubber composition crosslinkable by hydrosilylation, having a viscosity of 70,000 mPa·s.

The crosslinkable silicone rubber composition thus prepared was put between the surface protective films to prepare the laminate, where the laminate was heated for the crosslinking for 30 minutes in a hot air circulation type oven kept at 80° C., while the crosslinkable silicone rubber composition was kept 200 μm thick by 2 stainless steel rolls with an adjusted clearance.

[Silatrane Derivative Prepared in Reference Example 1]

Reference Example 1

A 500 mL four-neck flask equipped with a stirrer, thermometer and reflux condenser tube was charged with 12.2 g (0.2 mols) of 2-hydroxyethylamine, 88.9 g (0.6 mols) of vinyl trimethoxysilane, 94.5 g (0.4 mols) of 3-glycidoxypropyltrimethoxysilane and 32 g of methanol, and the mixture was heated with stirring for 8 hours at methanol reflux temperature.

The reaction mixture was totally put in an eggplant shaped flask, and treated by a rotary evaporator to distill off the low-boiling-point components, to produce 132 g of a lightly yellowish, transparent liquid. It was confirmed by 29Si- and 13C-NMR analysis, to contain a silatrane derivative, represented by the formula (8), at 90% by weight or more.

(8)

EXAMPLE 1

Production of Surface Protective Film (1)

A dope, described below, was spread by a reverse roll coater and dried on one side of a 38 μm thick PET film (Teijin Du Pont Films Japan's Tetron® HS) to form the coating film of cellulose acetate (thickness: 2 μm on a dry basis), to prepare the surface protective film (1).

Dope

Cellulose acetate (Daicel Chemical's LM80, acetylation degree: 51, SP value: 24.0(MPa)$^{1/2}$) was dissolved in a 3/2 mixture of acetone/MEK, to prepare a coating solution (dope) containing nonvolatiles at 8%.

Evaluation Results

The surface protective film (1) had an adhesion of 100%, peel strength of 0.9 N/m and adhesive strength of 420 N/m, and contained residual solvent at 3 μg/m$^2$. It showed sufficient quality as a surface protective film, no problem observed with respect to fisheye or film thickness.

EXAMPLE 2

Production of Surface Protective Film (2)

A dope, described below, was spread by a reverse roll coater and dried on one side of a 38 μm thick PET film (Teijin Du Pont Films Japan's Tetron® HS) to form the coating film of cellulose acetate (thickness: 2 μm on a dry basis), to prepare the surface protective film (2).

Dope

Cellulose acetate (Daicel Chemical's L20, acetylation degree: 55, SP value: 22.7(MPa)$^{1/2}$) was dissolved in a 3/2 mixture of acetone/MEK, to prepare a coating solution (dope) containing nonvolatiles at 8%.

Evaluation Results

The surface protective film (2) had an adhesion of 100%, peel strength of 1.0 N/m and adhesive strength of 420 N/m, and contained residual solvent at 3 μg/m$^2$. It showed sufficient quality as a surface protective film, no problem observed with respect to fisheye or film thickness.

Comparative Example 1

Preparation of Surface Protective Film (3)

A 38 μm thick PET film (Teijin Du Pont Films Japan's Tetron® HS) was prepared as the surface protective film (3).

This film was not coated with a cellulose acetate film.

Evaluation Results

The surface protective film (3) showed insufficient quality as a surface protective film, because it is bonded to the adhesive silicone rubber composition layer at too high a peel strength to be peeled off therefrom smoothly.

Comparative Example 2

Preparation of Surface Protective Film (4)

A PES film described below was prepared as the surface protective film (4).

This film was not coated with a cellulose acetate film.

PES Film

Sumitomo Chemical's PES resin Sumikaexcel® PES5200G) was dried at 160° C. for 8 hours to a moisture content of 0.08% by weight. The pelletized PES resin was melt-extruded at 300° C. by an extruder equipped with a T-die, and cooled and solidified into a 50 μm thick PES film.

Evaluation Results

The surface protective film (4) showed no problem with respect to peel strength at which it was bonded to the adhesive silicone rubber composition layer or adhesion, 1.1 N/m or 95%, respectively. However, the PES film showed insufficient quality as a surface protective film, because of frequently observed burring when punched by a Thomson punching machine, uneven film thickness of ±7% versus ±2% in the case of the PET film, and defective ratio of around 30%.

Comparative Example 3

Production of Surface Protective Film (5)

A dope, described below, was spread by a reverse roll coater and dried on one side of a 38 μm thick PET film (Teijin Du Pont Films Japan's Tetron® HS) to form the coating film of cellulose acetate (thickness: 2 μm on a dry basis), to prepare the surface protective film (5).

Dope

Cellulose acetate (Daicel Chemical's LT35, acetylation degree: 61, SP value: 20.9(MPa)$^{1/2}$) was dissolved in DMSO as a solvent, to prepare a coating solution (dope) containing nonvolatiles at 8%.

Evaluation Results

The surface protective film (5) showed no problem observed with respect to fisheye or film thickness. However, it showed insufficient quality as a surface protective film, because of high residual solvent content of 600 μg/m$^2$.

These evaluation results are summarized in Table 1.

TABLE 1

| EXAMPLES | Surface protective films | Residual solvent content, μg/m$^3$ | Adhesive strength, N/m | Peel strength, N/m | Adhesion (%) | Defective ratio | Overall evaluation |
|---|---|---|---|---|---|---|---|
| EXAMPLE 1 | LM80/PET | 3 | 420 | 0.9 | 100 | ○ | ○ |
| EXAMPLE 2 | L20/PET | 3 | 430 | 1.0 | 100 | ○ | ○ |
| COMPARATIVE EXAMPLE 1 | PET | — | — | Not peeled off | — | ○ | x |
| COMPARATIVE EXAMPLE 2 | PES | — | — | 1.1 | 95% | x | x |
| COMPARATIVE EXAMPLE 3 | LT35/PET | 600 | — | — | — | ○ | x |

○: Defective ratio: Below 30%
x: Defective ratio: 30% or more

The surface protective film of the present invention has advantages that it can be easily peeled off from an adhesive silicone rubber composition layer, is free of a plasticizer or the like, which may have an adverse effect on adhesion of the adhesive silicone rubber composition layer to a semiconductor chip or semiconductor chip attaching portion, and has no adverse effect on thickness uniformity or surface flatness of the adhesive silicone rubber composition layer. The surface protective film of the present invention can be easily peeled off from an adhesive silicone rubber composition layer, makes the adhesive silicone rubber composition layer highly adhesive to the semiconductor chip and semiconductor chip attaching portion, and hence helps produce excellent semiconductor devices.

What is claimed is:

1. A surface protective film for protecting an adhesive silicone rubber composition layer (C), comprising a base film (A) coated, at least on one side, with a cellulose-based resin layer (B) having an SP value of 21.0 to 29.0 $(MPa)^{1/2}$, determined by the Fedors method.

2. The surface protective film according to claim 1, wherein said base film (A) is a polyethylene terephthalate film, and said base film (A) and cellulose-based resin layer (B) are laminated at an adhesive strength of 200 N/m or more.

3. The surface protective film according to claim 1, wherein said cellulose-based resin layer (B) is of cellulose acetate having an acetylation degree of 47 to 63.

4. The surface protective film according to claim 1, wherein said cellulose-based resin layer (B) contains a residual organic solvent at 10 $\mu g/m^2$ or less.

5. The surface protective film according to claim 1, wherein said base film (A) is 10 to 200 $\mu m$ thick and cellulose-based resin layer (B) is 0.3 to 10 $\mu m$ thick.

6. A process for producing the surface protective film of one of claims 1 to 5, wherein a dope containing a cellulose-based resin is spread and dried at least on one side of said base film (A) to form said cellulose-based resin layer (B) thereon.

* * * * *